3,153,611
DIPHENYLETHYLENE FUNGICIDE

Raymond W. Luckenbaugh, Wilmington, Del., assignor to E. I. du Pont de Nemours and Company, Wilmington, Del., a corporation of Delaware
No Drawing. Filed Jan. 10, 1962, Ser. No. 165,304
8 Claims. (Cl. 167—30)

This invention relates to fungicidal methods and compositions.

More particularly, this invention concerns the use of 1,1′-dihalo-2,2-diphenylethylenes and compositions containing them in controlling soil fungi and especially controlling the common hard-to-kill genus, Rhizoctonia.

Heretofore, fungi in the genus Rhizoctonia were found to be very difficult to control using conventional soil fungicides. Since Rhizoctonia is found throughout most of the world and because it has a deleterious effect on the production of food crops, it is partially responsible for starvation in many parts of the world. It is now discovered that compounds of this invention are particularly effective against Rhizoctonia.

The general formula of these fungicidal compounds is:

(1) 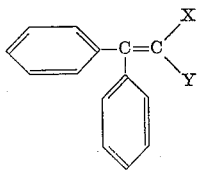

wherein X and Y are the same or different and can be chlorine, bromine and fluorine.

PREPARATION

Compounds used in this invention such as 1,1-dibromo-2,2-diphenylethylene and 1,1-dichloro-2,2-diphenylethylene are prepared by reacting the corresponding 1,1-diphenyl-2,2,2-trihaloethane with potassium hydroxide in the presence of ethanol as is described by Brand et al., Ber. 75, 1819 (1942), and Harris et al., J.A.C.S. 48, 3144. Difluorodiphenylethylene is obtained by heating the dichlorodiphenylethylene with a fluorinating agent such as silver fluoride, zinc fluoride or anhydrous potassium fluoride.

Illustrative of the compounds useful in this invention are the following:

1,1-dichloro-2,2-diphenylethylene
1,1-dibromo-2,2-diphenylethylene
1,1-difluoro-2,2-diphenylethylene
1-bromo-1-chloro-2,2-diphenylethylene
1-chloro-1-fluoro-2,2-diphenylethylene
1-bromo-1-fluoro-2,2-diphenylethylene Preferred because of their high activity, ease of formulation and economic use-cost ratio are the 1,1-dichloro and 1,1-dibromo-diphenylethylenes.

USE

The compounds used in this invention possess outstanding soil fungicidal activity with no apparent phytotoxicity to plants when applied to the soil in fungicidal concentrations. They can be used to control such fungi as *Rhizoctonia solani*, *Pythium* spp., and *Fusarium* spp. The compounds used in this invention are particularly effective in controlling the hard-to-kill fungus genus Rhizoctonia. The dihalo-diphenylethylenes can also be used to control such turf diseases as dollar spot caused by *Sclerotinia homoeocarpa*, brown patch caused by *Pellicularia filamentosa*, snow mold caused by *Fusarium nivale*, copper spot caused by *Gleocercospora sorghi*, and blight caused by Helminthosporium spp. These compounds can be used, additionally, as seed treatments on seeds such as corn, cotton, peanuts, sorghum and the like. When applied to seeds, these compounds protect them, while germinating, from attack by soil-borne pathogens such as those belonging to the genus Rhizoctonia.

The dihalo-diphenylethylenes, when applied to the soil at a rate of from about 10 to 100 pounds active agent per acre or 0.5 to 4 pounds active per 12,000 feet of row give good control of the above-named fungi. Particularly, good results are achieved when the active agent is applied at the rate of 20 to 40 pounds per acre or when applied as an in the furrow treatment at the rates of 1.5 to 4 pounds active per 12,000 feet of row.

COMPOSITIONS

Soil fungicidal compositions will comprise at least one compound of Formula 1 and one or more surfactants.

The surfactants or "surface-active agents" can include such anionic, cationic and non-ionic surface-active agents as heretofore have been generally employed in pest control compositions of similar type. Suitable surface-active agents are set out for example in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers—Up to Date" (1960) by John W. McCutcheon, Inc., and Bulletin E-607 of the Bureau of Entomology and Plant Quarantine of the U.S. Department of Agriculture.

Suitable surfactants for use in compositions of the present invention are: polyethylene glycol fatty esters, fatty alkylol amide condensates, alkyl aryl sulfonates, fatty alcohol sulfates, dialkyl esters of sodium sulfosuccinate, fatty acid esters of sodium isethionate, polyoxy ethylene thioether and long chain quaternary ammonium chloride.

Among the more preferred surfactants are those anionic and non-ionic agents recognized in the art as wetting agents, detergents or emulsifiers. Among anionic surfactants, preferred ones are alkali metal or amine salts of alkyl benzene sulfonic acids such as dodecylbenzene sulfonic acid, sodium lauryl sulfate, alkyl naphthalene sulfonates, sodium N-methyl-N-oleoyltaurate, oleic acid ester of sodium isethionate, dioctyl sodium sulfosuccinate, sodium dodecyldiphenyl oxide disulfonate. Among non-ionic compounds, the preferred members are alkyl phenoxy poly(ethyleneoxy)ethanols such as nonyl phenol adducts with ethylene oxide; trimethyl nonyl polyethylene glycol ethers, polyethylene oxide adducts of fatty and rosin acids, long chain alcohol or mercaptan adducts with ethylene oxide.

Surfactants can be present in compositions in the range of 0.02 to 20% by weight. However, 0.2 to 10% by weight is preferred.

Soil fungicidal compositions, according to the invention, can be prepared as concentrates containing from 2 to 50% of a dihalo-diphenylethylene. The composition can contain conventional formulating agents. It is preferred that they be formulated in compositions which contain a free-flowing inert powder with or without a surfactant present or inert liquid solvent together with the surfactant.

The free-flowing inert powders can be any of the extenders commonly employed in the fungicide art and they can include natural clays such as attapulgite, diatomaceous earth, talcs, synthetic mineral fillers derived from silica and silicate such as synthetic fine silica and synthetic calcium or magnesium silicate, wood flour and walnut shell flour.

Particle size of the extender can vary considerably but will ordinarily be somewhat under 50 microns in the finished formulation.

The inert powder will be present in the above-described solid compositions in the range of 40 to 98% by weight.

In the preferred liquid compositions of the invention, a dihalo-diphenylethylene, xylene or other inert oil and surfactant are mixed to form a concentrated liquid which can conveniently be poured and measured. Such solutions can be mixed with water at the point of application to form an emulsion containing the fungicide, oil and the surface-active agent.

The liquid diluent will be present in the above-described concentrated liquid compositions in the range of 50 to 80% by weight.

Additionally, other fungicides can be added to compositions containing a dihalo-diphenylethylene to cover a broad spectrum of fungus control. Illustrative of these fungicides are:

p-Dimethylaminobenzene diazosodium sulfonate;
Quinone oxyaminobenzooxylhydrazine;
Tetraalkyl thiuram disulfides such as tetramethyl thiuram disulfide and tetraethyl thiuram disulfide;
Metal salts of ethylene bisdithiocarbamic acid, e.g., sodium, manganese, zinc and iron salts;
N-trichloromethylmercapto-4-cyclohexene-1,2 - dicarboximide;
N-trichloromethylthiophthalimide;
2,3-dichloro-1,4-naphthoquinone;
2,3,5,6-tetrachloro-1,4-benzoquinone;
2,4-dichloro-6-(p-chloroanilino)-s-triazine;
Copper A;
Metal salts of alkyl and dialkyl dithiocarbamic acid, e.g., Zn, Na, K, Fe, Mn, Ni;
Zinc pyridinethione; and
S-(1-oxido-2-pyridyl)-isothiuronium chloride.

A preferred mixture of fungicides will comprise at least one compound of Formula 1 and one or more salts of ethylene bisdithiocarbamate. This combination is preferred because of the wide variety of fungi that will be controlled.

The above fungicides are added to compositions containing a dihalo-diphenylethylene at the rate of 1 to 20 pounds to each 10 pounds of dihalo-diphenylethylene. Of course, more or less of the above listed fungicides can be added to the dihalo-diphenylethylene composition depending on the fungi present in the area to be protected.

Compositions of this invention can be extended with water and then sprayed on a band approximately 4 inches wide over an acre of open furrows containing seeds. The spray is directed in such a way as to strike the sides of the furrows as well as the bottom of the furrow. The furrow is then closed and the seeds are fully protected from fungi, particularly Rhizoctonia.

In order that the invention may be better understood, reference should be had to the following illustrative examples. It should be understood that all the following percentages are by weight.

*Example 1*

| | Percent |
|---|---|
| 1,1-dichloro-2,2-diphenylethylene | 25 |
| Xylene | 71 |
| Blend of alkyl aryl polyether alcohols and oil soluble petroleum sulfonates | 4 |

One-half gallon of the water extendable liquid composition described above which contains approximately 1½ pounds of active is diluted with water to give a total volume of 10 gallons. This diluted preparation is then sprayed on a band, 4 inches wide, over one acre of open furrows containing cotton seeds. This spray is directed in such a way so as to strike the sides of the furrows as well as the seeds on the bottom of the furrow. The furrow is then closed, thus completing the planting operation.

The above treatment gives essentially complete protection of cotton seed from damage by fungi such as the genus Rhizoctonia which are common in cotton soils.

*Examples 2–6*

The compounds described in Examples 2–6 are substituted for the 1,1-dichloro-2,2-diphenylethylene of Example 1 in like amount by weight and are formulated in like manner to obtain a water extendable liquid composition. This water extendable liquid is also applied in like manner as described for the composition of Example 1 and substantially the same results are obtained.

Example 2—1,1-dibromo-2,2-diphenylethylene
Example 3—1,1-difluoro-2,2-diphenylethylene
Example 4—1-bromo-1-chloro-2,2-diphenylethylene
Example 5—1-chloro-1-fluoro-2,2-diphenylethylene
Example 6—1-bromo-1-fluoro-2,2-diphenylethylene

*Example 7*

| | Percent |
|---|---|
| 1,1-dibromo-2,2-diphenylethylene | 50.0 |
| Alkyl naphthalene sulfonate, Na salt | 1.5 |
| Partially desulfonated sodium lignin sulfonate | 1.0 |
| Attapulgite clay | 47.5 |

The above composition is prepared as a wettable powder by blending and micropulverizing the components until the particle size is substantially all below 50 microns.

This composition can be extended with water and applied in the row at the rate of 2 pounds of active ingredient per acre. This application will prevent the fungi *Fusarium oxysporum* and *Fusarium lycopersici*, for example, from attacking young tomato seedlings planted in the treated soil.

A similar application will protect tobacco plants from the tobacco black shank caused by *Phytophthora parasitica* var. *nicotianae*.

*Examples 8–9*

The compounds described in Examples 8–9 are substituted for the 1,1-dibromo-2,2-diphenylethylene of Example 7 in like amount by weight and are formulated in like manner. When applied in the same manner as the compositions of Example 7, like results are obtained.

Example 8—1,1-dichloro-2,2-diphenylethylene
Example 9—1-bromo-1-chloro-2,2-diphenylethylene

*Example 10*

| | Percent |
|---|---|
| 1,1-difluoro-2,2-diphenylethylene | 2 |
| Granular 15–30 mesh attaclay | 98 |

The active compound is dissolved in acetone and sprayed upon tumbling attaclay. The acetone is then evaporated to yield a granular composition.

This formulation can be rotovated on four inch bands, in the center of the rows, at the rate of 4 pounds active per 12,000 feet of row. Truck crops such as cucumber, tomato, bean and corn planted in the treated row are essentially protected from damping-off fungi such as Pythium spp.

*Examples 11–15*

The compounds of Examples 11–15 are substituted in like amount by weight for the 1,1-difluoro-2,2-diphenylethylene in Example 10 and are formulated in like manner. When applied in like manner as the active compound of Example 10, the compounds in Examples 11-15 give substantially the same results.

Example 11—1,1-dichloro-2,2-diphenylethylene
Example 12—1,1-dibromo-2,2-diphenylethylene
Example 13—1-bromo-1-chloro-2,2-diphenylethylene
Example 14—1-chloro-1-fluoro-2,2-diphenylethylene
Example 15—1-bromo-1-fluoro-2,2-diphenylethylene

*Example 16*

|  | Percent |
|---|---|
| 1-chloro-1-bromo-2,2-diphenylethylene | 50.0 |
| Dioctyl sodium sulfosuccinate (85% active, solidified with 15% sodium benzoate) | 1.0 |
| Low viscosity methyl cellulose | 0.3 |
| Diatomaceous silica | 48.7 |

The above composition is blended and micropulverized to a particle size below 50 microns.

Three pounds of the above composition and 4.5 pounds of 80% manganese ethylene bisdithiocarbamate composition are added to 20 gallons of water and applied to one acre of turf by spraying. This treatment gives essentially complete control of such fungus caused diseases as brown patch, dollar spot, snow mold, copper spot and blight.

*Examples 17–19*

The compounds of Examples 17–19 are substituted for the 1-chloro-1-bromo-2,2-diphenylethylene of Example 16 in like amount by weight and are formulated in like manner. When the resulting composition is combined with like amount of manganese ethylene bisdithiocarbamate and applied in like manner essentially the same results are obtained.

Example 17—1,1-dichloro-1,1-diphenylethylene
Example 18—1,1-dibromo-1,1-diphenylethylene
Example 19—1,1-difluoro-1,1-diphenylethylene

*Example 20*

|  | Percent |
|---|---|
| 1,1-dichloro-2,2-diphenylethylene | 50.0 |
| Sodium lauryl sulfate | 1.5 |
| Low viscosity polyvinyl alcohol | 1.0 |
| Synthetic fine calcium silicate | 48.5 |

The above components are mixed and micropulverized to a particle size below 50 microns.

Three pounds of the above formulated powder and 4 parts of sodium ethylene bisdithiocarbamate in a concentrated water solution known as the trade name "Nabam" are added to 40 gallons of water and are applied to the sides of furrows by spraying as well as directly on cotton seeds planted in the furrows. The furrow is covered immediately after treatment. The described treatment gives commercially acceptable control of both *Rhizoctonia solani* and *Pythium spp.*, common fungi in cotton soils.

*Example 21*

|  | Percent |
|---|---|
| 1,1-dichloro-2,2-diphenylethylene | 50.0 |
| Sodium lignin sulfonate | 2.0 |
| Alkyl naphthalene sulfonic acid, Na salt | 1.0 |
| Ethylene glycol | 0.5 |
| Watchtung red lake | 0.15 |
| Oil soluble red dye | 0.10 |
| Calcined montmorillonite clay | 46.25 |

The above components are blended and micropulverized to give a composition suitable for application to seeds, either as a dust or as a liquid slurry in water.

Treatment of cotton seeds with this composition at the rate of 4 ounces of active ingredient per 100 pounds of cotton seed protects the seed and young seedlings from attack by *Rhizoctonia solani*.

The invention claimed is:

1. Method of controlling fungi in soil, said method comprising the application to said soil of a fungicidally effective amount of a compound of the formula:

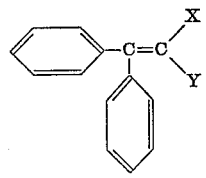

wherein
   X and Y are each separately selected from the group consisting of chlorine, bromine and fluorine.

2. Method for the control of the fungus *Rhizoctonia solani*, said method comprising the application to the locus to be protected of a fungicidally effective amount of a compound of the formula:

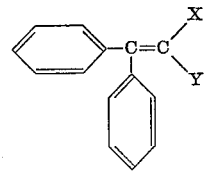

wherein
   X and Y are each separately selected from the group consisting of chlorine, bromine and fluorine.

3. Method of controlling fungi in soil, said method comprising the application to said soil of a fungicidally effective amount of 1,1-dichloro-2,2-diphenylethylene.

4. Method of controlling fungi in soil, said method comprising the application to said soil of a fungicidally effective amount of 1,1-dibromo-2,2-diphenylethylene.

5. Method of controlling fungi in soil, said method comprising the application to said soil of a fungicidally effective amount of 1,1-difluoro-2,2-diphenylethylene.

6. Method of controlling fungi on seeds, said method comprising the application to said seeds of a fungicidally effective amount of a compound of the formula:

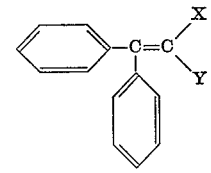

wherein
   X and Y are each separately selected from the group consisting of chlorine, bromine and fluorine.

7. Method of controlling fungi on cotton seeds, said method comprising the application to said cotton seeds of a fungicidally effective amount of a compound of the formula:

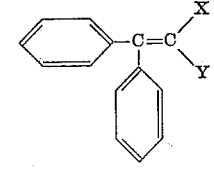

wherein
   X and Y are each separately selected from the group consisting of chlorine, bromine and fluorine.

8. A fungicidal composition comprising a fungicidally effective amount of a compound of the formula:

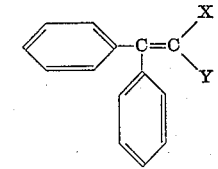

wherein
   X and Y are each separately selected from the group consisting of chlorine, bromine and fluorine;

0.2 to 10% by weight of surfactant selected from the group consisting of anionic, cationic and non-ionic surfactants;
40 to 98% by weight of a non-phytotoxic inert extender; and
.1 to 2 parts by weight of a fungicide selected from the group consisting of metal salts of ethylene bis-dithiocarbamic acid, for each part by weight of compound of the above-described formula.

References Cited in the file of this patent

UNITED STATES PATENTS

| | | |
|---|---|---|
| Re. 23,742 | Hester | Nov. 24, 1953 |
| 2,113,625 | Monteith | Apr. 12, 1938 |
| 2,515,107 | Amick | July 11, 1950 |

OTHER REFERENCES

Brand: Ber. 75, 1819 (1942).
Harris: J.A.C.S. 48, 3144 (1926).